(12) United States Patent
Hatch et al.

(10) Patent No.: US 7,248,211 B2
(45) Date of Patent: Jul. 24, 2007

(54) MOVING REFERENCE RECEIVER FOR RTK NAVIGATION

(75) Inventors: Ronald R. Hatch, Wilmington, CA (US); Richard T. Sharpe, Torrance, CA (US)

(73) Assignee: Navcom Technology Inc., Torrance, CA (US)

( * ) Notice: Subject to any disclaimer, the term of this patent is extended or adjusted under 35 U.S.C. 154(b) by 332 days.

(21) Appl. No.: 10/899,570

(22) Filed: Jul. 26, 2004

(65) Prior Publication Data

US 2006/0017611 A1    Jan. 26, 2006

(51) Int. Cl.
*G01S 5/04* (2006.01)
(52) U.S. Cl. .................. 342/357.03; 342/357.08; 342/357.09
(58) Field of Classification Search .......... 342/357.03, 342/357.06, 357.08, 357.09, 357.13; 701/207, 701/213–215
See application file for complete search history.

(56) References Cited

U.S. PATENT DOCUMENTS

| | | | |
|---|---|---|---|
| 5,899,957 A | 5/1999 | Loomis ................ | 701/214 |
| 6,100,842 A | 8/2000 | Dreier et al. .......... | 342/357.08 |
| 6,342,853 B1 | 1/2002 | Kalafus et al. ........ | 342/357.03 |
| 2005/0024263 A1 | 2/2005 | Sharpe et al. | |

FOREIGN PATENT DOCUMENTS

| | | |
|---|---|---|
| EP | 0609935 A2 | 8/1994 |
| JP | 09061509 | 3/1997 |

OTHER PUBLICATIONS

International Search Report for International Application No. PCT/US2005/015836, International Filing Date May 5, 2005, dated Nov. 21, 2005.

Keenan, C.R., et al., "Using the Information from Reference Station Networks: A Novel Approach Conforming to RTCM V2.3 and Future V3.0," IEEE 2002 Position Location and Navigation Symposium, Palm Springs, CA, Apr. 15-18, 2002, pp. 320-322.

Hwang, P.Y., et al., "Enhanced Differential GPS Carrier-Smoothed Code Processing Using Dual Frequency Measurements," Proceedings of the Institute of Navigation (ION) GPS, Sep. 18, 1998, pp. 461-470.

*Primary Examiner*—Dao L. Phan
(74) *Attorney, Agent, or Firm*—Morgan, Lewis & Bockius LLP

(57) ABSTRACT

A method and system are provided to determine a relative position vector between primary receiver associated with a reference station and secondary receiver associated with a user. The method and system determine a position of the reference station at the reference station according to signals received thereat from a plurality of satellites, determine a position of the user receiver at the user based on measurements obtained thereat and on error corrections computed at the reference station, and compute the relative position vector by differencing the position of the reference station and the position of the user.

19 Claims, 8 Drawing Sheets

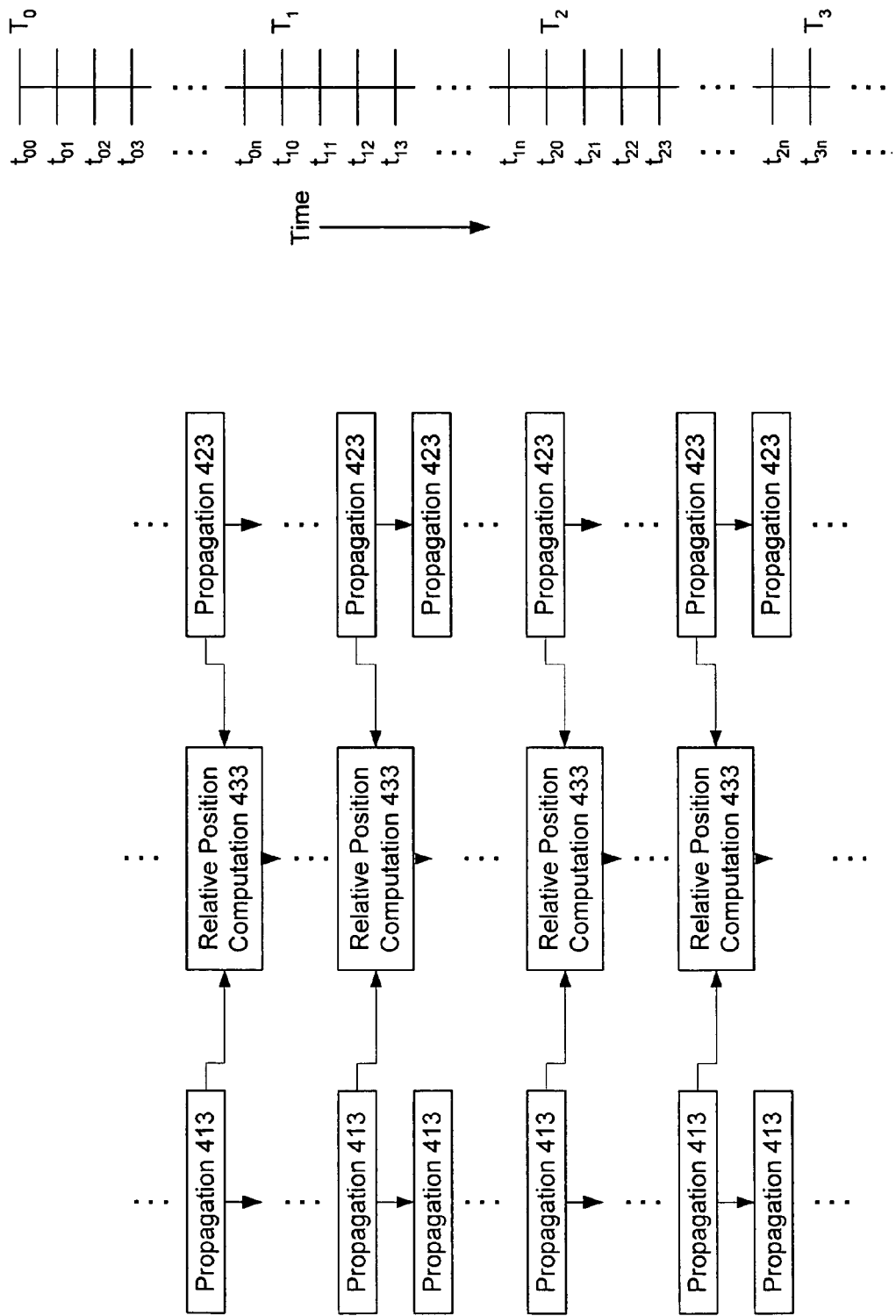

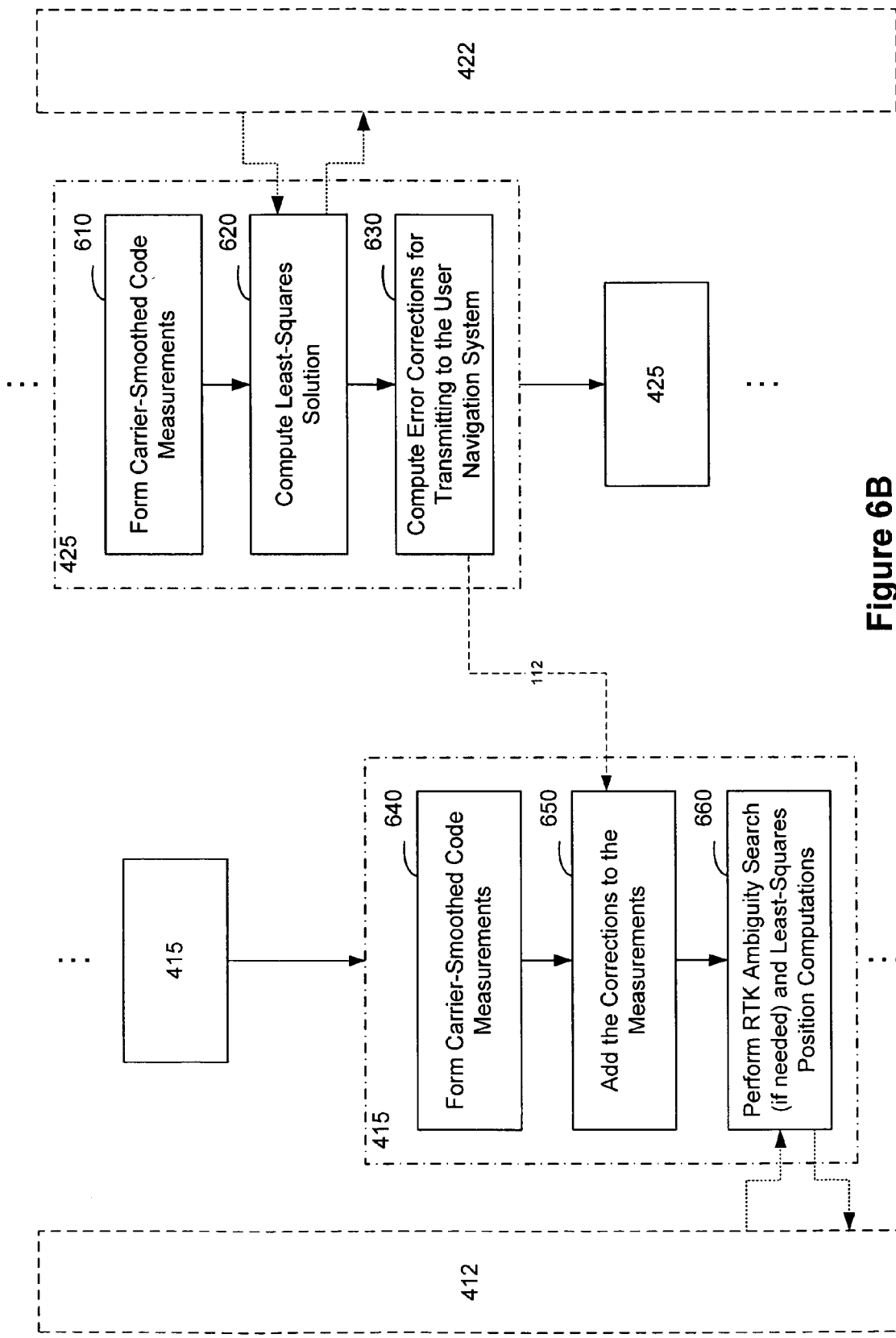

MOVING REFERENCE RECEIVER FOR RTK NAVIGATION

The present invention relates generally to satellite positioning technologies, and more particularly to a method for real-time kinematic positioning with a stationary or moving reference receiver.

BACKGROUND OF THE INVENTION

The global positioning system (GPS) uses satellites in space to locate objects on earth. With GPS, signals from the satellites arrive at a GPS receiver and are used to determine the position of the GPS receiver. Currently, two types of GPS measurements corresponding to each correlator channel with a locked GPS satellite signal are available for civilian GPS receivers. The two types of GPS measurements are pseudorange, and carrier phase for two carrier signals, L1 and L2, with frequencies of 1.5754 GHz and 1.2276 GHz, or wavelengths of 0.1903 m and 0.2442 m, respectively. The pseudorange measurement (or code measurement) is a basic GPS observable that all types of GPS receivers can make. It utilizes the C/A or P codes modulated onto the carrier signals. The measurement records the apparent time taken for the relevant code to travel from the satellite to the receiver, i.e., the time the signal arrives at the receiver according to the receiver clock minus the time the signal left the satellite according to the satellite clock. The carrier phase measurement is obtained by integrating a reconstructed carrier of the signal as it arrives at the receiver. Thus, the carrier phase measurement is also a measure of a transit time difference as determined by the time the signal left the satellite according to the satellite clock and the time it arrives at the receiver according to the receiver clock. However, because an initial number of whole cycles in transit between the satellite and the receiver when the receiver starts tracking the carrier phase of the signal is usually not known, the transit time difference may be in error by multiple carrier cycles, i.e., there is a whole-cycle ambiguity in the carrier phase measurement.

With the GPS measurements available, the range or distance between a GPS receiver and each of a multitude of satellites is calculated by multiplying a signal's travel time by the speed of light. These ranges are usually referred to as pseudoranges (false ranges) because the receiver clock generally has a significant time error which causes a common bias in the measured range. This common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. With standalone GPS navigation, where a user with a GPS receiver obtains code and/or carrier-phase ranges with respect to a plurality of satellites in view, without consulting with any reference station, the user is very limited in ways to reduce the errors or noises in the ranges.

To eliminate or reduce these errors, differential operations are typically used in GPS applications. Differential GPS (DGPS) operations typically involve a base reference GPS receiver, a user (or navigation) GPS receiver, and a data link between the user and reference receivers. The reference receiver is placed at a known location and the measurements obtained there at are supplied to the user receiver. By differencing the measurements taken at the reference station and the user receiver, most of the errors or noises in the calculated ranges can be eliminated or greatly reduced. Differential operations using carrier-phase measurements are often referred to as real-time kinematic (RTK) positioning/navigation operations.

The fundamental concept of Differential GPS (DGPS) is to take advantage of the spatial and temporal correlations of the errors inherent in the GPS measurements to cancel the noise factors in the pseudorange and/or carrier phase measurements resulting from these error factors. When the distance between the reference and user receivers is within a certain limit, carrier-phase differential or RTK techniques are the most accurate techniques available for positioning and navigation purposes. However, the accuracy of RTK techniques diminishes as the correlation of the error factors diminishes when the distance between the reference and user receivers becomes too large.

For wide-area operations, various regional, wide-area, or global DGPS (hereafter referred to as wide-area DGPS or WADGPS) techniques have been developed. A WADGPS system includes a network of multiple reference stations in communication with a computational center or hub. Error corrections are computed at the hub based upon the known locations of the reference stations and the measurements taken by them. The computed error corrections are then transmitted to users via data link such as satellite, phone, or radio. Although the accuracy of the WADGPS systems are enhanced by using multiple reference stations, it has not been able to match the accuracy of a local RTK system, which is capable of reaching accuracies in the order of one centimeter as long as the separation distance between the reference and user receivers is sufficiently short.

SUMMARY OF THE INVENTION

A method and system according to one embodiment of the present invention determine a relative position vector between a primary receiver associated with a reference station and a secondary receiver associated with a user by: (1) determining a position of the reference station according to signals received thereat from a plurality of satellites; (2) determining a position of the user receiver based on measurements obtained thereat and on error corrections computed at the reference station; and (3) computing the relative position vector by differencing the position of the reference station and the position of the user. Each of the user and the reference receivers may be moving or stationary. The relative position vector may be computed at the reference station, the user, or a separate data processing system that receives the position of the reference station from the reference station and the position of the user from the user. In the following discussions, the position of the reference station is sometimes referred to as the "reference position." Likewise, the position of the user is sometimes referred to as the "user position."

In one embodiment of the present invention, the position of the reference station or the user is updated at a high rate using successive changes in carrier-phase measurements obtained at the reference station or the user, respectively. A concurrent low-rate process is also run at the reference station or the user to provide periodic position corrections to the respective position updates produced at the high rate. The relative position vector can be computed at either the high rate or the low rate or some other rate depending on the availability of both the user and the reference positions required for the computation.

The error corrections to measurements are computed at the reference station by forming carrier-smoothed code measurements, computing a correction to an estimated position of the reference station using the carrier-smoothed code measurements, computing a theoretical range from the reference station to each of the plurality of satellites, and computing the error corrections based on the theoretical ranges. The error corrections are transmitted from the reference station to the user via a data link between the user and the reference station.

By computing the error corrections and the reference position at the reference station, the present invention minimizes the necessary information transfer between the reference and user receivers. It also allows a high rate of position output with minimal increase in the communication load between the reference and user receivers. Furthermore, the present invention distributes the necessary computation between the reference receiver and the user receiver in a natural fashion such that the computation load is not excessive at either the reference or the user receiver. Moreover, the present invention minimizes the latency in outputting the user position updates by not requiring the user to use synchronized data from the reference receiver.

BRIEF DESCRIPTION OF THE DRAWINGS

FIG. 4B is a flowchart illustrating a series of processes for computing the updates to the relative position vector.

FIG. 5 is a diagram illustrating two concurrent series of time epochs used by the user subsystem or the reference subsystem.

FIG. 6B is a flowchart illustrating position correction processes performed by the user subsystem and by the reference subsystem, respectively, according to one embodiment of the present invention.

PREFERRED EMBODIMENT

To overcome the deficiency of conventional RTK systems while maintaining the same accuracies, the concept of a moving reference station is being developed. Conventional techniques employing moving reference stations, however, all involve forming the differences of the carrier-phase measurements between the user receiver and the moving reference station and solving for a separation vector between the user receiver and the moving reference station directly. Also described in the literature are techniques for relative navigation of multiple vehicles. These techniques, however, have typically employed a common stationary reference site.

Figure 1:
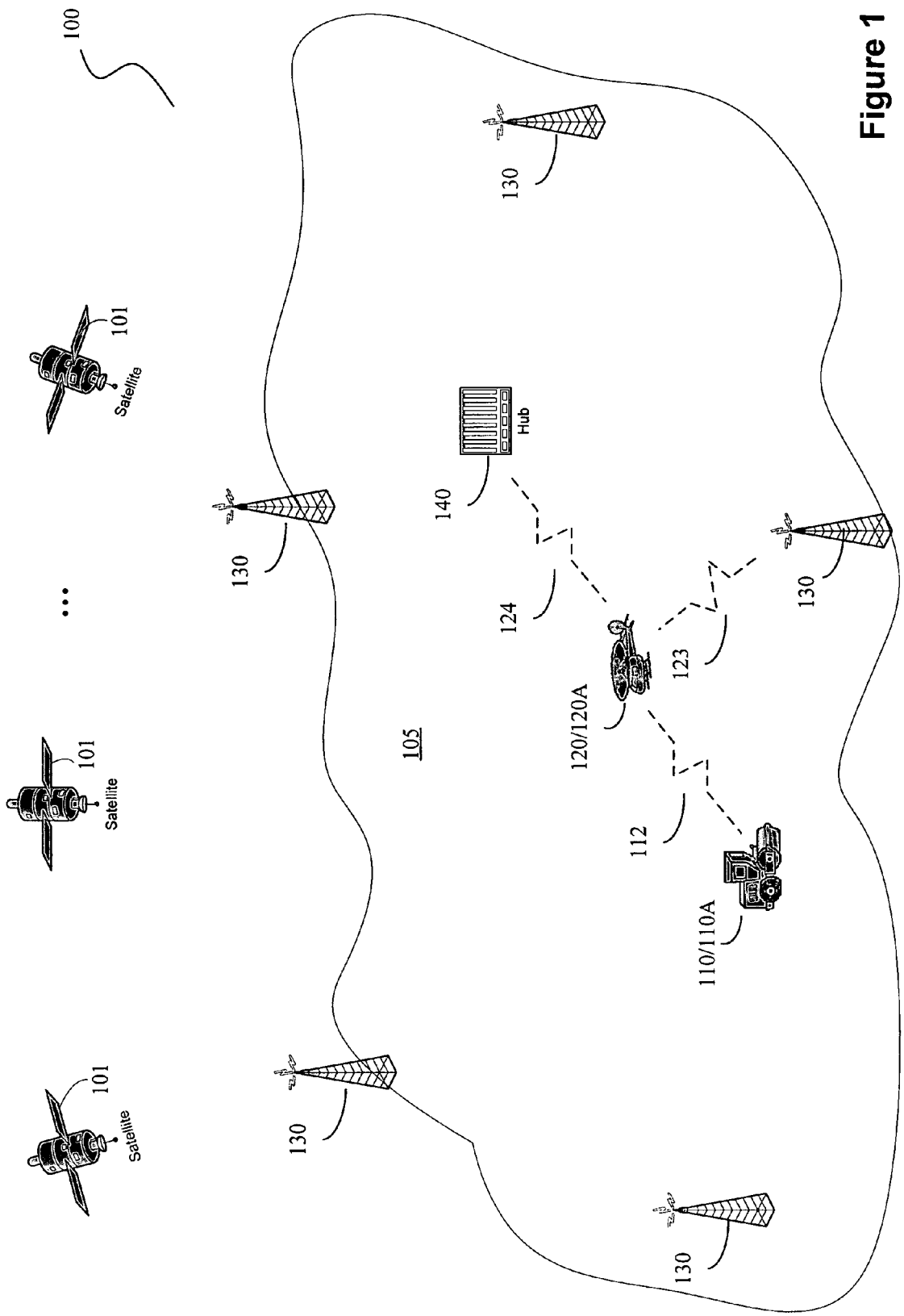
FIG. 1 is a diagram illustrating a satellite navigation system according to one embodiment of the present invention.

FIG. 1 illustrates a satellite navigation system 100 in which navigation processes according to one embodiment of the present invention can be implemented. As shown in FIG. 1, system 100 includes a user subsystem 110 associated with a moving or stationary object 110A, and a reference subsystem 120 associated with a moving or stationary object 120A. The user subsystem 110 and the reference subsystem 120 are communicatively coupled with each other via a data link, which allows transferring data between the two subsystems 110 and 120 using a mechanism such as radio frequency signals. The reference subsystem 120 may also be linked via a data link 123 to a local stationary reference station 130. The local stationary reference station 130 may be one of a network of stationary reference stations 130 in a global or wide area satellite navigation network. In this case, the network of stationary reference stations 130 are placed at known locations across a wide area 105 or around the globe, and continuously provide GPS observables to one or more hubs 140 of the wide-area or global satellite navigation network for processing. These observables include GPS code and carrier phase measurements, ephemerides, and other information obtained according to signals received from a plurality of satellites 101 at the stationary reference stations 130. The hubs 140 are facilities at which the GPS observables are processed and corrections are computed. If multiple independent hubs are provided, it is preferred that they are geographically separated and operate in parallel. The reference subsystem 120 may additionally or optionally receive computation results such as GPS corrections from the processing hubs 140 via a communication channel 124 such as satellite broadcasting, wireless Internet connection, etc. The reference subsystem 120 is positioned as needed using the object 120A to maintain the data link 112 with the user GPS subsystem 110 and the data link 123 with a nearby stationary reference station 130 or the hub 140.

Figure 2:
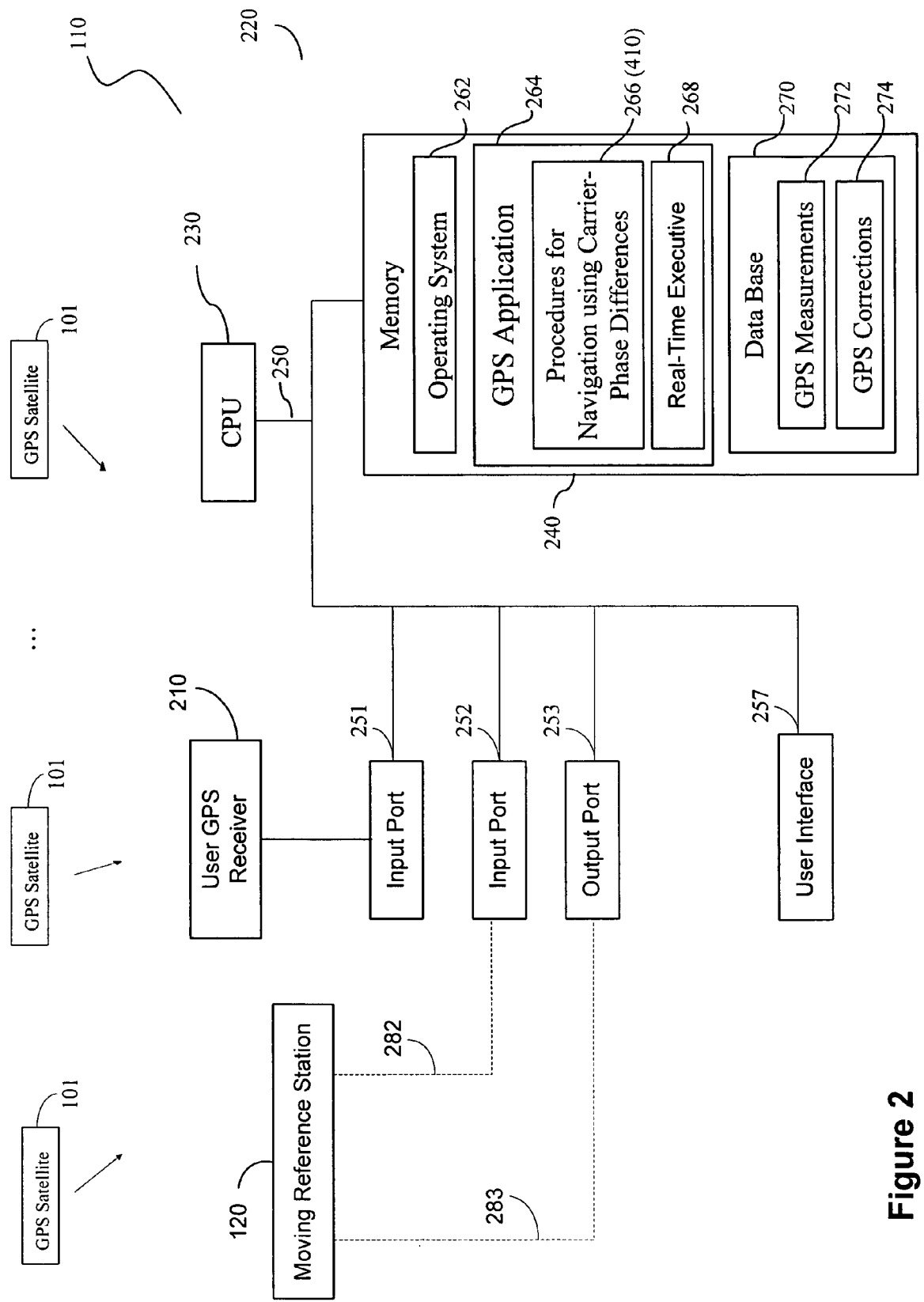
FIG. 2 is a block diagram of a navigation subsystem associated with a user of the satellite navigation system according to one embodiment of the present invention.

FIG. 2 illustrates the user subsystem 110 according to one embodiment of the present invention. Subsystem 110 includes a user GPS receiver 210 and a microprocessor-based computer system 220 coupled to the user receiver 210. The user receiver 210 is attached to the object 110A and provides raw GPS observables to system 220 for processing. These observables include GPS code and carrier phase measurements, and may also include ephemerides and other information obtained according to signals received from the plurality of satellites 101. The computer system 220 includes a central processing unit (CPU) 230, a memory device 240, input ports 251 and 252, one or more output ports 253, and an optional user interface 257, interconnected by one or more communication buses 250. The input ports 251 and 252 are for receiving data from the user receiver 210 and the reference subsystem 120, respectively. The output port(s) 253 can be used for outputting calculation results to the moving reference station 120 and/or other data processing system(s) (not shown). Calculation results may also be shown on a display device of the user interface 257.

Memory 240 may include high-speed random access memory and may include nonvolatile mass storage, such as one or more magnetic disk storage devices. Memory 240 may also include mass storage that is remotely located from the central processing unit 230. Memory 240 preferably stores an operating system 262 and GPS application programs or procedures 264, including procedures 266 implementing a method for navigation using successive changes in carrier-phase measurements according to one embodiment of the present invention. The operating system 262 and application programs and procedures 264 stored in memory 240 are for execution by the CPU 230 of the computer system 220. Memory 240 preferably also stores a database 270 including data structures used during the execution of the GPS application procedures 266, such as GPS measurements 272 and corrections 274, as well as other data structures discussed in this document. The operating system 262 may be, but is not limited to, the embedded operating system, UNIX, Solaris, or Windows 95, 98, NT 4.0, 2000 or XP. More generally, operating system 262 has procedures and instructions for communicating, processing, accessing, storing and searching data.

For reasons stated below, the memory 240 may also store a real time executive (RTX) 268, which is a computer program for real time multi-tasking operations. In one embodiment of the present invention, the RTX 268 permits embedding the operating system 262 into the procedures 266 to provide multiple threads, so that different tasks in the procedures 266 can be run "quasi-concurrently," meaning that different tasks may seem to be running at the same time and that system 220 may appear to be doing different jobs simultaneously. This will allow the procedures 266 to include two or more concurrent tasks or processes that are run in different threads. The RTX 268 controls the start and stop of each of the threads and allows the threads to interact with each other. The RTX 268 also allows queuing data to a thread, sending data between threads, and serializing a process by keeping events in order.

In addition, RTX 268 supports standard multithread controls such as allowing the execution of a thread to wait on events that are triggered by events on another thread. An event is a state that can be set or cleared on a thread. When a thread is set to wait on one or more events, the thread is suspended until all of the events are set. This substantially simplifies synchronization and communications among threads. With RTX 268, thread execution is based on priority. The thread with a higher priority runs before the thread with a lower priority. Among threads with the same priority, the threads are executed in a round robin fashion. Each thread is given a time slice in which to run. An off-the-shelf commercial RTX can be used as the RTX 268. Examples of such commercially available real time executives include the CMX-RTX from CMX Systems, Inc., the Concurrent Real time Executive (CORTEX) from Australian Real Time Embedded Systems (ARTESYS), and the Nucleus RTX, from Accelerated Technology Inc.

In some embodiments, the user receiver 210 and part or all of the computer system 220 are integrated into a single device, within a single housing, such as a portable, handheld or even wearable position tracking device, or a vehicle-mounted or otherwise mobile positioning and/or navigation system. In other embodiments, the GPS receiver 210 and the computer system 220 are not integrated into a single device.

Figure 3:
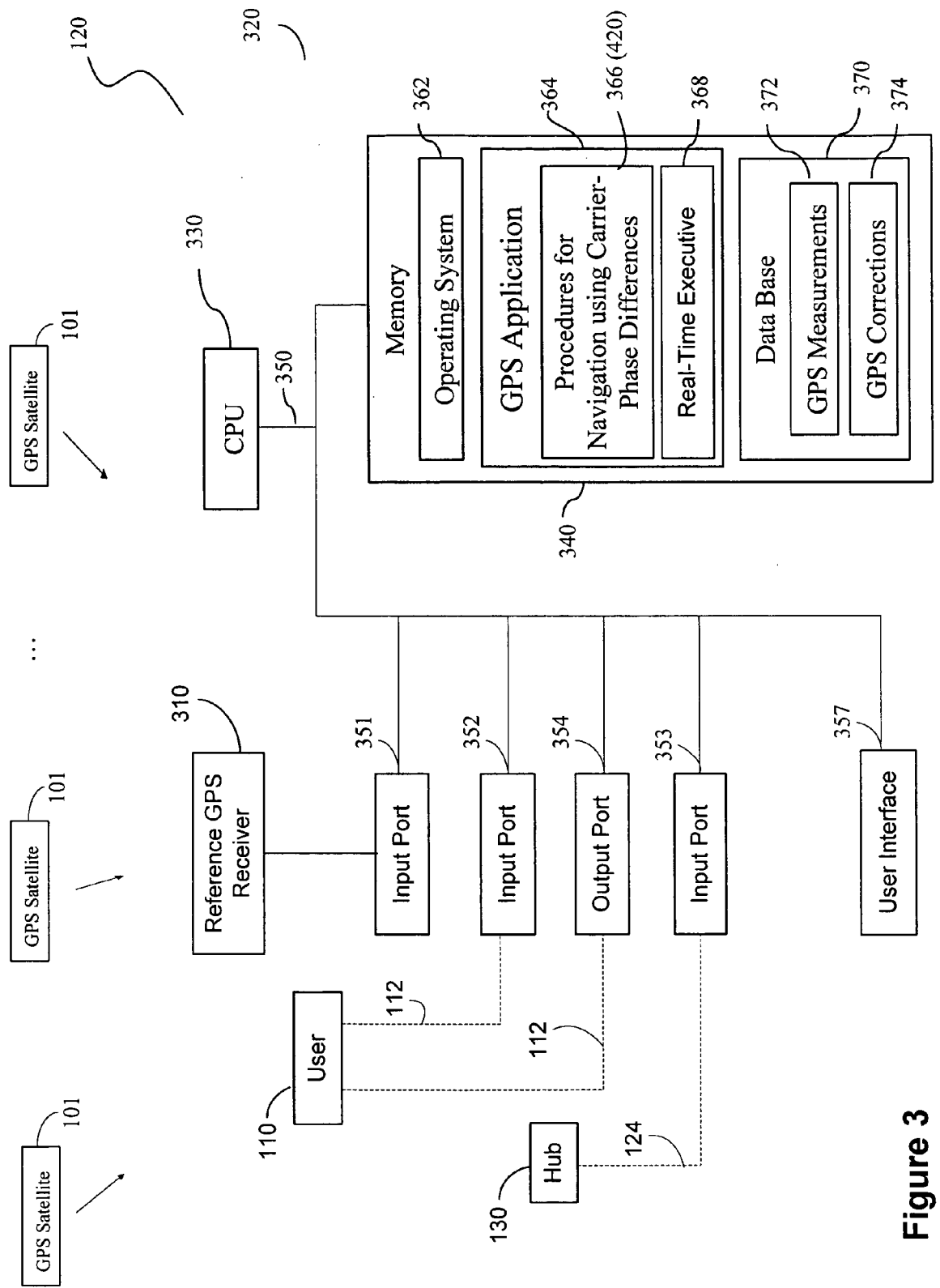
FIG. 3 is a block diagram of a navigation subsystem associated with a moving reference station in the navigation system according to one embodiment of the present invention.

FIG. 3 illustrates the reference subsystem 120 according to one embodiment of the present invention. Subsystem 120 includes a reference GPS receiver 310 and a microprocessor-based computer system 320 coupled to the Reference receiver 310. The Reference receiver 310 is attached to the object 120A and provides raw GPS observables to system 320 for processing. These observables include GPS code and carrier phase measurements, and may also include ephemerides and other information obtained according to signals received from the plurality of satellites 101. The computer system 320 includes a central processing unit (CPU) 330, a memory device 340, input ports 351, 352, and 353, one or more output ports 354, and an optional user interface 357, interconnected by one or more communication buses 350. The input ports 351, 352, and 353 are for receiving data from the reference receiver 310, the user subsystem 110, and the stationary reference station 130 or the hub 140, respectively. The output ports 354 can be used for outputting calculation results to the user subsystem 110 and/or other data processing systems (not shown). Calculation results may also be shown on a display device of the user interface 357.

Memory 340 may include high-speed random access memory and may include nonvolatile mass storage, such as one or more magnetic disk storage devices. Memory 340 may also include mass storage that is remotely located from the central processing unit 330. Memory 340 preferably stores an operating system 362 and GPS application programs or procedures 364, including procedures 366 implementing a method for navigation using successive changes in carrier-phase measurements according to one embodiment of the present invention. The operating system 362 and application programs and procedures 364 stored in memory 340 are for execution by the CPU 330 of the computer system 320. Memory 340 preferably also stores a database 370 including data structures used during the execution of the GPS application procedures 366, such as GPS measurements 372 and corrections 374, as well as other data structures discussed in this document. The operating system 362 is similar to the operating system 262. For reasons stated below, the memory 340 may also store a real time executive (RTX) 368 that is similar to the RTX 268.

In some embodiments, the reference receiver 310 and part or all of the computer system 320 are integrated into a single device, within a single housing, such as a portable, handheld or even wearable position tracking device, or a vehicle-mounted or otherwise mobile positioning and/or navigation system. In other embodiments, the GPS receiver 310 and the computer system 320 are not integrated into a single device.

Figure 4A:
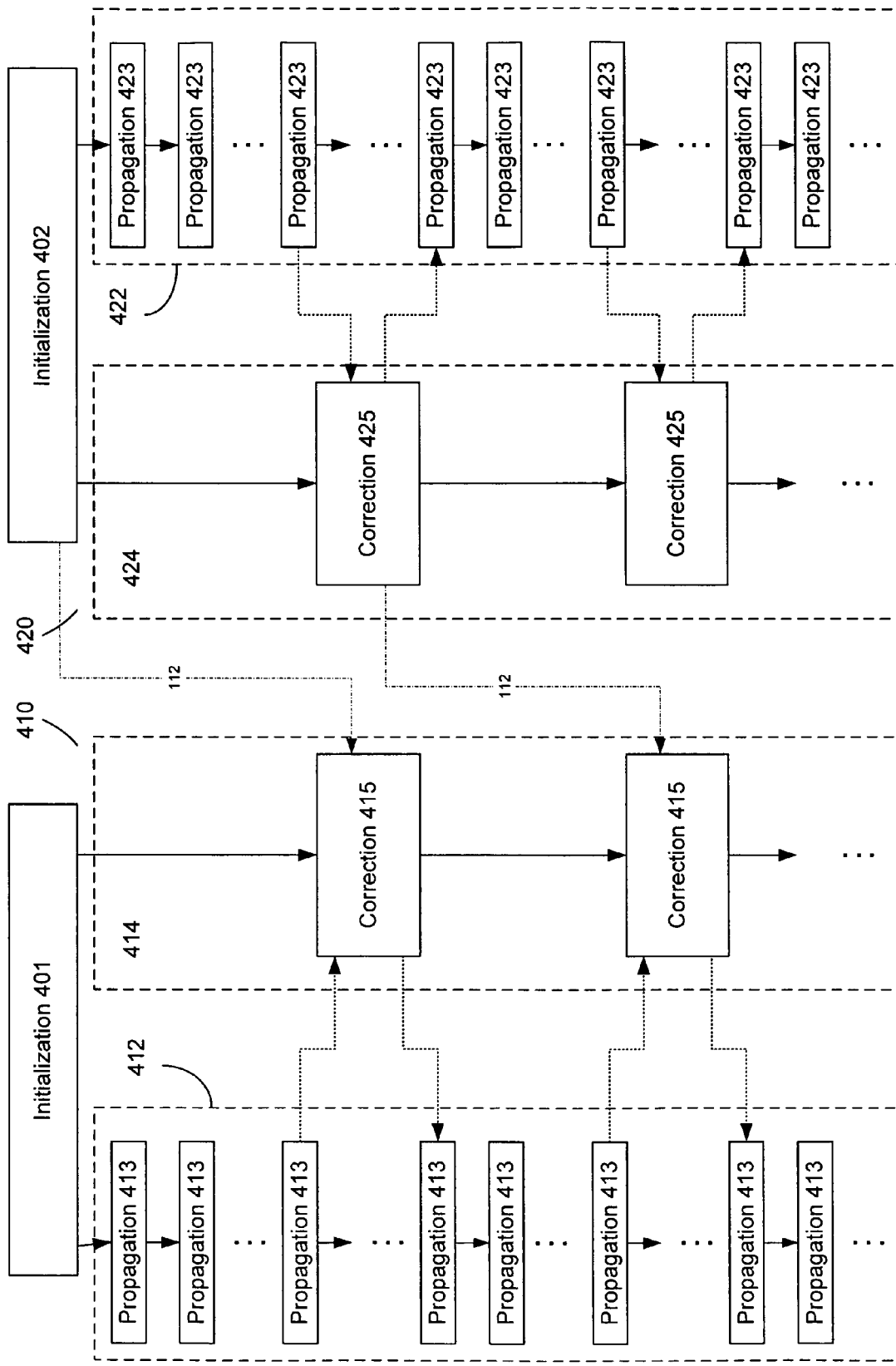
FIG. 4A is a flowchart illustrating navigation processes performed by the user subsystem and by the reference subsystem according to one embodiment of the present invention.

FIG. 4A illustrates a navigation process 410 performed by the user subsystem 110 as implemented in the procedures 266 and a navigation process 420 performed by the reference subsystem 120 as implemented in the procedures 366 according to one embodiment of the present invention. As shown in FIG. 4A, navigation process 410 includes an initialization process 401 and two concurrent processes, a high-rate process 412 and a low-rate process 414. The initialization process 401 is used to compute an initial position of the user receiver 210 attached to the object 110A and other initial parameters required by the high-rate process 412. The high-rate process 412 includes a series of position propagation processes 413 each computing an update to the user position in one of a series of minor epochs. The low-rate process 414 includes a series of position correction processes 415 each computing a correction to the user position in one of a series of major epochs. As shown in FIG. 5, there may be a number, such as 10, minor epochs $t_{mn}$ (m=0, 1, 2, 3, . . . and n=0, 1, 2, 3, . . . ) within each major epoch $T_m$. The minor epochs may also coincide with the major epochs if high-rate production of computed positions is not required.

Similarly, as also shown in FIG. 4A, navigation process 420 includes an initialization process 402 and two concurrent processes, a high-rate process 422 and a low-rate process 424. The initialization process 402 is used to compute an initial position of the reference receiver 310 and other initial parameters required by the high-rate process 422. The initialization process 402 may also compute measurement corrections to be used by the processing in the user subsystem 110. The high-rate process 422 includes a series of position propagation processes 423 each computing an update to the reference position in one of a series of minor epochs. The low-rate process 414 includes a series of position correction processes 425 each computing a correction to the reference position in one of a series of major epochs and measurement corrections.

The updates to the user position computed in some or all of the position propagation processes 413 and the updates to the reference position computed in some or all of the position propagation processes 423 are used to compute updates to a relative position vector from the reference receiver 310 attached to the object 120A to the user receiver 210 attached to the object 110A using a series of relative position computation processes 433 as shown in FIG. 4B. The relative position computation processes 433 can be performed in either the reference or the user receiver or both, or it can be performed in a separate data processing system, as explained in more detail below.

Because of the difficulty in resolving carrier-phase ambiguities at the reference station, conventional RTK computation makes use of "double differences" of the carrier-phase measurements to cancel satellite and receiver clock errors and to help determine integer ambiguities in the GPS carrier phase measurements. Since the double differences include observations along 4 different paths (from each of 2 observation sites to each of 2 satellites), this approach requires that raw carrier-phase measurements at a reference site be transmitted to the user and that the user wait until data from the reference site arrive before forming the double differences. The present invention deviates from conventional techniques by using a novel method to generate corrections to the carrier-phase measurements at the reference subsystem 110 and transmitting the corrections instead of raw measurements from the reference subsystem 110 to the user subsystem 120 via the data link 112.

Computing the corrections to the carrier-phase measurements at the reference subsystem 120 reduces the amount of computations which the user subsystem 110 has to perform and generally eliminates the need for the user subsystem 110 to have information about where the reference receiver 310 is located. Furthermore, while the raw measurements reflect the entire dynamics of the satellites 101 (and the receiver forming the measurements), the corrections have the dynamics removed and, thus, change only slowly with time. This means that the effect of latency introduced by computation time and data link transfer time becomes less significant. Computing the corrections at the reference subsystem 120 also allows a lower data transfer rate from the reference subsystem 120 to the user subsystem 110. For example, a one-Hertz data transfer rate can easily be used to support a ten-Hertz user position output.

Figure 6A:
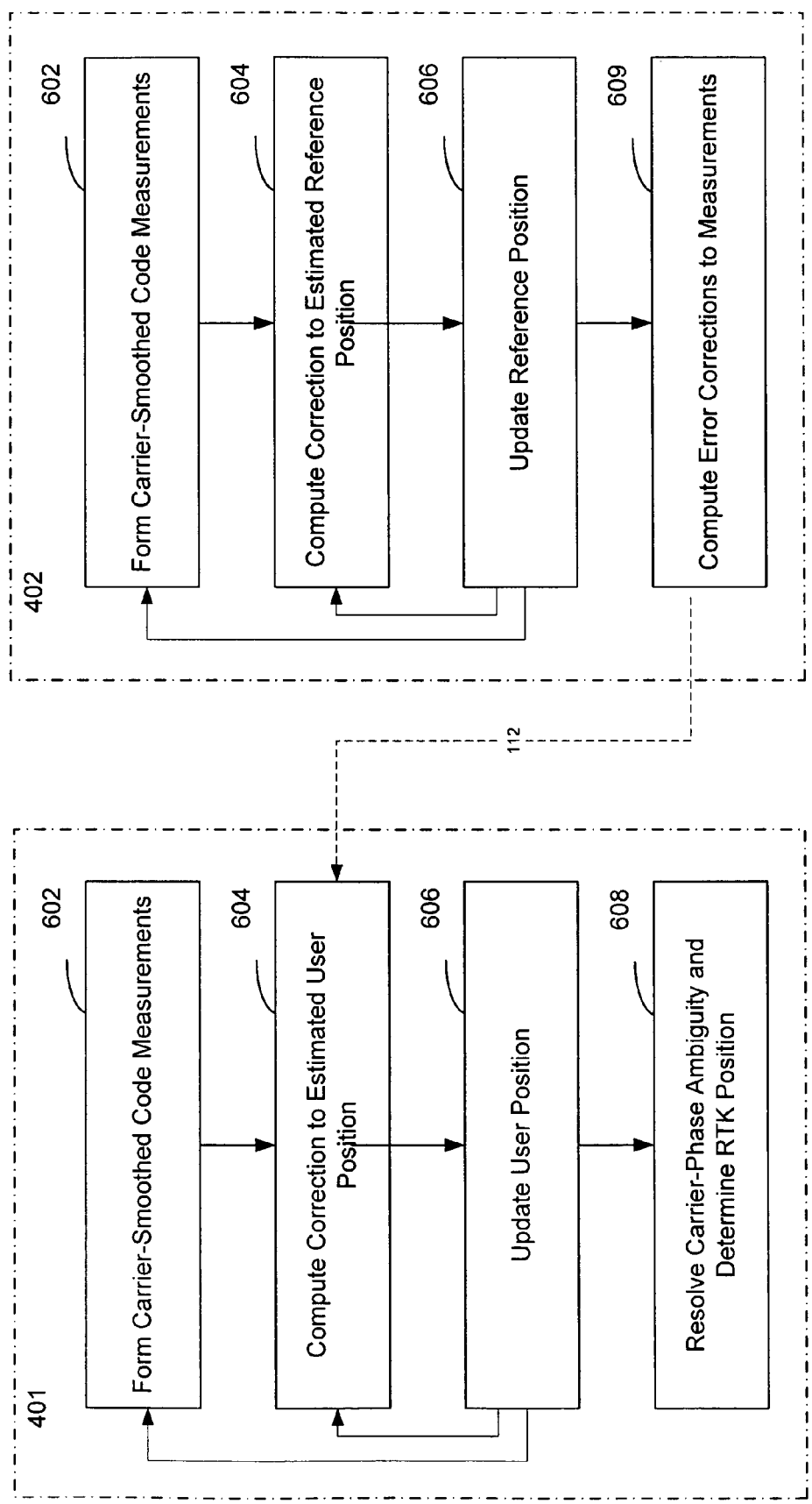
FIG. 6A is a flowchart illustrating initialization processes performed by the user subsystem and by the reference subsystem, respectively, according to one embodiment of the present invention.

FIG. 6A illustrates the initialization process 401 performed by the user subsystem 110, according to one embodiment of the present invention. As shown in FIG. 6A, the initialization process 401 includes a step 602 in which carrier-smoothed code measurements are formed. In step 602, code measurements obtained at the user receiver 210 are smoothed using combinations of corresponding carrier-phase measurements at the L1 and L2 frequencies. Many GPS receivers make both a C/A-code measurement and a P-code measurement on the L1 or L2 frequency, and either of the C/A or P-code measurements can be used as the L1 or L2 code measurements. However, since small biases exist between the measurements on the two difference codes, whichever of the two is used in the reference subsystem 310, the same should also be used for the equivalent process in the user subsystem 210. In the following discussion, for each satellite visible at the user receiver 210 and for each measurement epoch, the L1 and L2 frequencies will be designated as $f_1$ and $f_2$, respectively, the raw pseudorange code measurements on the L1 and L2 frequencies at will be designated as $P_1$ and $P_2$, respectively, and the raw carrier phase measurement on the L1 and L2 frequencies will be designated as $\phi_1$ and $\phi_2$, respectively.

In one embodiment of the present invention, a linear combination of the carrier-phase measurements in the L1 and L2 frequencies with respect to each satellite 101 is formed to match the ionospheric refraction effects on the corresponding code measurements on the L1 and L2 frequencies. The carrier-phase combination that matches the ionospheric refraction effect on the $P_1$ code measurement is designated as $M_1$ and is formed as follows:

$$M_1 = \frac{f_1^2 + f_2^2}{f_1^2 - f_2^2} L_1 - \frac{2f_2^2}{f_1^2 - f_2^2} L_2 \cong 4.09\, L_1 - 3.09\, L_2 \qquad (1)$$

The carrier-phase combination that matches the ionospheric refraction effect on the $P_2$ code measurement is designated as $M_2$ and is formed as follows:

$$M_2 = \frac{2f_1^2}{f_1^2 - f_2^2} L_1 - \frac{f_1^2 + f_2^2}{f_1^2 - f_2^2} L_2 \cong 5.09\, L_1 - 4.09\, L_2 \qquad (2)$$

where $L_1$ and $L_2$ are the carrier-phase measurements scaled by the wavelengths of the L1 and L2 signals, respectively, and each includes an approximate whole-cycle ambiguity value that has been added to cause the scaled carrier-phase measurement to be close to the same value as the corresponding code measurement. Thus, $$L_1 = (\phi_1 + N_1)\lambda_1 \qquad (3)$$

$$L_2 = (\phi_2 + N_2)\lambda_2 \qquad (4)$$

where the whole-cycle values of $N_1$ and $N_2$ have been initialized at the start of carrier-phase tracking to give values that are within one carrier wavelength of the corresponding code measurements so as to keep the differences between the scaled carrier-phase measurements and the corresponding code measurements small.

Using the carrier-phase combinations $M_1$ and $M_2$, the smoothed code measurements can be formed as follows:

$$O_{i,j} = O_{i-1,j} + (P_{i,j} - M_{i,j} - O_{i-1,j})/\eta \qquad (5)$$

$$S_{i,j} = O_{i,j} + M_{i,j} \qquad (6)$$

where subscript i is used to designate a particular measurement epoch, subscript j is used to designate the measurements at the two different frequencies so that j=1 or 2, O designates a smoothed offset between a code measurement and a corresponding carrier-phase combination, and S designates the smoothed code measurement. The value of $\eta$ is equal to i until a maximum value of averaging is attained. For example, if the carrier-phase measurement is assumed to have only $1/100^{th}$ of the noise of the code measurement, the value of "$\eta$" would be limited to 100 squared or 10,000.

Alternatively, the smoothed code measurements can be obtained as follows:

$$S_{i,j} = \bar{S}_{i,j} + \frac{1}{\eta}\left(P_{i,j} - \bar{S}_{i,j}\right) \qquad (7)$$

where:

$$\bar{S}_{i,j} = S_{i-1,j} + M_{i,j} - M_{i-1,j}$$

This alternative smoothing process projects the code measurement ahead using the change in the carrier-phase combinations and then averages the difference between that projection and the code measurement.

The smoothed code measurements on the two frequencies can be combined to form a refraction-corrected (RC) smoothed code measurement as follows:

$$S_i = \frac{f_1^2}{(f_1^2 - f_2^2)}S_{i,1} - \frac{f_2^2}{(f_1^2 - f_2^2)}S_{i,2} \cong S_{i,1} - 1.5457(S_{i,1} - S_{i,2}) \qquad (8)$$

A different process for obtaining the RC carrier-smoothed code measurements can be found in the co-owned patent application, "Method for Generating Clock Corrections for a Wide-Area or Global Differential GPS System," U.S. patent application Ser. No. 10/630,302, which disclosure is incorporated herein by reference.

It may take an initializing period that covers a number of measurement epochs before reliable RC carrier-smoothed code measurements can be produced in each succeeding measurement epoch. After the initializing period is passed, the initialization process 401 further includes a step 604 in which a correction to an estimated user position is computed. While any of several conventional satellite navigation methods could be used in step 604, in one embodiment of the present invention, a least-squares process is used to compute the position correction in step 604. In the least-squares process, navigation using measurements with respect to satellites is described as a discrete-time controlled process governed by a set of linear stochastic difference equations each corresponding to one of the satellites 101 involved. For each of the satellites involved, the equation can be expressed as $$z = hx + n \qquad (9)$$

where x is a state correction vector representing a correction to the state of the discrete-time controlled process, which in this case may include the corrections to the user position and a clock time associated with the user receiver 210; z represents the value of a measurement innovation, which is defined by the difference between a measurement taken by the user receiver 210 with respect to a satellite and an expected value for the measurement that is computed from an originally estimated state; n represents the noise in the measurements; and h is a measurement sensitivity vector, which characterize the sensitivity of the measurement to a change in the state.

The measurement in the innovation is the carrier-smoothed code measurement with respect to the satellite in either the L1 or L2 frequency computed in step 602, or it can be the RC carrier-smoothed code measurement. Whichever measurements are used in the innovation, they should be corrected using corrections computed in the initialization process 402 performed at the reference subsystem 120 and transmitted to the user subsystem 110, as explained in more detail below. The h vector is formed by expanding the equation relating the pseudorange measurements with the position of the GPS receiver in a Taylor-series. The elements of h include the first derivatives of the measurement innovation with respect to the correction vector. The state correction vector x includes at least a correction to the reference position. It may also include a correction to the user receiver clock. For ease of discussion in the following, we will assume the state vector is a four-element vector, i.e., the state includes just the corrections to the user receiver position and the receiver clock time.

Equation (9) can be expanded to relate the state correction vector with a set of measurements with respect to multiple satellites at a common measurement epoch:

$$z = Hx + n \qquad (10)$$

In this equation z is a vector consisting of the innovations with respect to the multiple satellites, H is a matrix consisting of the measurement sensitivities with respect to the multiple satellites, x remains as the state vector, and n is a measurement noise vector including a set of measurement noise values associated with the innovations in z. The measurement sensitivity matrix H is dependent on a geometry of the satellites 101, which refers to a totality of the geometrical relationships between the user receiver 210 and the satellites 101. The measurement innovations in the vector z are often referred to as prefix residuals, The least-squares solution to Equation (10) is:

$$x = (H^T H)^{-1} H^T z \qquad (11)$$

where the superscript T represents the transpose operation and the superscript "−1" represents the matrix inverse operation.

An alternative to solving Equation (10) using Equation (11) is to solve for a weighted least-squares solution which is given by:

$$x = (H^T W^{-1} H)^{-1} H^T W^{-1} z \qquad (12)$$

where W is a measurement covariance matrix having diagonal elements representing standard deviations of the measurement noises in the noise vector n, and non-diagonal elements representing covariance between measurements. Since the covariance between measurements is generally assumed to be zero, the non-diagonal elements of W is generally zero.

For ease of description, in the following discussions, the simple least-squares equation, Equation (3), is used. Equation (3) can be further simplified to give:

$$x = AH^T z \qquad (13a)$$

or $$x = Bz \qquad (13b)$$

where $A = (H^T H)^{-1}$ and $B = AH^T$.

It is also useful sometimes to form a residual sensitivity matrix, S, which maps the innovations, z, or the prefix residuals, into postfix residuals corresponding to the measurements in the innovations z. The post-fix residuals are represented as elements in a residual vector Δ:

$$\Delta = Sz \qquad (14)$$

where $$S = (I - H(H^T H)^{-1} H^T) = I - HB \qquad (15)$$

where I is a square identity matrix with a rank equal to the number of measurements, or the number of elements in z.

The initialization process 401 further includes a step 606, in which the correction to the user position in the correction vector, x, is added to the originally estimated user position to give a corrected estimate of the user receiver position. The correction to the user receiver clock is often treated as a nuisance parameter and not updated. This is possible because the dependence on the receiver clock is linear and large errors in the value do not affect the position solution. Since the range equations, Equations (9)-(15), are nonlinear, steps 604 and 606 may need to be iterated if the initial position estimate has a large error. Steps 604 and 606 in the initialization process 401 may be iterated using a same set of measurements obtained in a measurement epoch. Or, the iteration may include part of step 602 in addition to steps 604 and 606 to cover multiple measurement epochs. Thus, several major epochs in the initialization process 201 may be taken before a good estimate of the user position and associated matrices A and H (or B and S) are obtained.

Thereafter, the initialization process 401 further includes a step 608, in which an RTK position can be determined around this good estimate of the user position by first resolving the integer ambiguities in the carrier-phase measurements. A conventional ambiguity search technique can be used for this purpose. Alternatively, the ambiguity search technique described in the co-owned patent application "Fast Ambiguity Resolution for Real-Time Kinematic Survey and Navigation." U.S. Patent Application Number, which disclosure is incorporated herein by reference, can be used. The resolved whole-cycle ambiguities are used to adjust the carrier-phase measurements and the adjusted carrier-phase measurements are again used to compute the user receiver position using Equations (9) to (15) to obtain the initial user position to be used in subsequent processing.

As shown in FIG. 6A, the initialization process 402 performed by the reference subsystem 120 is similar to the initialization process 401 except that step 608 is not performed. Also, corrections from a stationary reference station 130 or from the hub 140 may be used to correct the measurements used to form the innovation vector z. Furthermore, an additional step 609 is included to compute measurement corrections for transmitting to the user subsystem 110 via the data link 112. To compute the measurement corrections in step 609, the corrected user position is used to compute a theoretical range to each of the satellites 101 involved in the computation. This theoretical range is subtracted from the measurements to give raw corrections to the measurements, i.e., $$\epsilon^i = m^i - \rho^i \quad (16)$$

where the superscript i designates a particular satellite 101, $m^i$ designates a measurement of a particular type, such as a smoothed code or carrier-phase measurement, with respect to the satellite, $\rho^i$ designates the computed theoretical range with respect to the satellite, and $\epsilon^i$ designates a raw correction to the measurement.

The raw corrections are biased by a common receiver clock error, which can be estimated by taking an average of the raw corrections for a particular type of measurements across all of the involved satellites 101. An unbiased correction, δ, to a measurement is then obtained by removing this common bias from the raw correction:

$$\delta^i = \epsilon^i - \sum_k \epsilon^k \quad (17)$$

A set of these corrections is generated for each measurement type, i.e. the L1 smoothed code, the L2 smoothed code, the L1 carrier phase and the L2 carrier phase, with respect to each involved satellite 101. This method of computing the corrections ensures that any global, wide-area, or RTK corrections that were used in computing the moving reference receivers position are reflected automatically in the corrections generated for transmission to the user receiver. If the moving reference position is smooth, i.e. no sudden jumps in position, the corrections will be smooth and they will change in value only slowly with time.

Once the initial user position and associated matrices A and H (or B and S) are computed in the initialization process 410, the high-rate process 412 and the low-rate process 414 are started. Similarly once the initial reference position and associated matrices A and H (or B and S) are computed in the initialization process 402, the high-rate process 422 and the low-rate process 424 are started. In one embodiment of the present invention, the performance of processes 412 and 414 (or processes 422 and 424) are controlled by the RTX 268 (or the RTX 368), which starts two separate threads after the initialization process 401 (or 402) to run the processes 412 and 414 (or processes 422 and 424), respectively. A higher priority may be given to the thread on which the high-rate process 414 (or 424) is run and a lower priority may be give to the thread on which the low-rate process 412 (or 422) is run. The RTX also controls queuing of data on each thread and passing of data between threads, as explained in more detail below.

The low-rate process 414 (or 424) computes a correction to the corresponding receiver position and the associated matrices A and H (or B and S) in each major epoch using the position correction process 415 (or 425). FIG. 6B illustrates the position correction process 415 performed by the user subsystem 110 and the position correction process 425 performed by the reference subsystem 120 according to one embodiment of the present invention. As shown in FIG. 6B, the position correction process 425 performed by the reference subsystem 120 includes a step 610 in which carrier-smoothed code measurements are formed by updating the carrier-smoothed code measurements from the initialization process (402) or a previous position correction process 425. The raw measurements used to compute the carrier-smoothed code measurements may include corrections received by the reference receiver 310 from a stationary reference station 130 or from the hub 140. As described above, the carrier-smoothed code measurements in the L1 and L2 frequencies with respect to each satellite can be used to form a refraction-corrected (RC) combination of the carrier-smoothed code measurement.

The position correction process 425 performed by the reference subsystem 120 further includes a step 620 in which a correction to a reference position update recently computed in the high-rate process 422 is computed. A process similar to that in step 604, which includes a position correction computation process described above in association with Equations (9) to (15), can be used to obtain the correction to the reference position and the associated matrices A and H (or B and S) in step 620. The computed correction to the reference position is queued for use by the high-rate process 422 also performed by the reference subsystem 120, as explained in more detail below.

The position correction process 425 performed by the reference subsystem 120 further includes a step 630 in which measurement corrections are computed. To compute the corrections, the computed correction to the reference position is added to the reference position update from the high rate process to obtain a corrected estimate of the reference position, which is then used to compute a theoretical range to each of the satellites 101 involved in the computation. The measurement corrections to are then computed according to Equations (16) and (17), as described above. The computed corrections are transmitted to the user subsystem 110 via data link 112, as shown in FIG. 6B.

To ensure that the corrections computed in the low-rate process 420 change only slowly so as not to introduce any latency problems at the user subsystem 110, a very smooth reference position output is desired. Using smoothed code measurements to compute the reference position corrections, as discussed above, helps to ensure that the reference position updates are smooth. In addition, care must be taken that the dropping or addition of measurements from one or more satellites does not cause a step change in position. A number of different methods can be used to deal with the dropping or addition of measurements to ensure a smooth reference position output. One method is to employ a Kalman Filter in the low-rate process 424 which weights the carrier-phase measurements significantly higher than the code measurements. Another method is to introduce measurement bias states which drive the residuals toward zero when the Least Squares technique is used in the low-rate process 424. These bias states are not allowed to change very rapidly. When measurements from a new satellite are introduced into the solution, its bias states are set such that the measurements agree with the position obtained from the other satellites. When measurements from one or more satellites are lost the bias states are allowed to adjust only slowly.

Using the global or wide area differential GPS corrections provided by the StarFire global and wide area networks available from John Deere and Company, U.S.A., to correct the measurements used to compute the corrections in the low-rate process 424 will make the reference solution more accurate and help ensure that the position solution is smooth. It is even possible to use an RTK solution for the reference position, which depends upon corrections from some other (presumably fixed) reference site 130. This kind of implementation might be used for example as a method of extending the line of site in an environment where obstructions or hills are present. The reference receiver 310 could be a portable or vehicle mounted receiver, which is positioned as needed to make sure the user receiver 210 is in its line of site while it remains in the line of site of the fixed reference receiver 130.

The Wide Area Augmentation System developed by the U.S. government provides corrections which can introduce step changes of 10 centimeters or more in the position solution. Thus, unless some method is used to smooth out these steps, they can have an adverse impact on the relative navigation or on the latency effects at the user receiver.

As shown in FIG. 6B, the position correction process 415 performed by the user subsystem includes a step 640 in which carrier-smoothed code measurements are formed by updating the carrier-smoothed code measurements from the initialization process 401 or a previous position correction process 415. As described above, the carrier-smoothed code measurements in the L1 and L2 frequencies with respect to each satellite can be used to form a refraction-corrected (RC) combination of the carrier-smoothed code measurement.

The position correction process 415 performed by the user subsystem 110 further includes a step 650 in which the corrections to GPS measurements mostly recently received from the reference subsystem 120 via data link 112 are used to correct the respective GPS measurements, including the carrier-phase measurements and the carrier-smoothed code measurements computed in step 640, to obtain the respective corrected measurements. Since the corrections change slowly with time, it is acceptable for the position correction process 415 at the user subsystem 110 to use corrections that are one or more seconds old. Test have shown that this increases the position noise by a negligible amount. Thus, the user subsystem 110 does not need to wait for the synchronous corrections from the reference subsystem 120 to be generated to start processing its own GPS measurements, meaning that the position updating process 410 at the user subsystem 110 suffer less latency due to the delay in the computation of the corrections at the reference subsystem 120 or in the transmission of the corrections using the data link 112 from the reference subsystem 120 to the user subsystem 110.

A non-standard processing procedure will arise if the reference subsystem 120 employs some form of navigation in which the reference position is allowed to take some sudden position jumps. For example, if the WAAS differential system is used to navigate the object 120A using the specified algorithms, ten centimeter jumps in position are common. To avoid similar sized position jumps in the relative vector difference requires that the Least-Squares computation in the user subsystem 110 be delayed until the corrections from the same time epoch are received at the user subsystem 110. This causes an increased latency in the output of the user receiver position updates.

The position correction process 415 performed by the user subsystem 110 further includes a step 660 in which a correction to a user position update recently computed and queued in the high-rate process 412 is computed. A process similar to that in step 604 described above can be used to obtain the correction to the user position and the associated matrices A and H (or B and S) in step 660. The computed correction to the user position is queued for use by the high-rate process 412 also performed by the user subsystem 110, as explained in more detail below.

Figure 7:
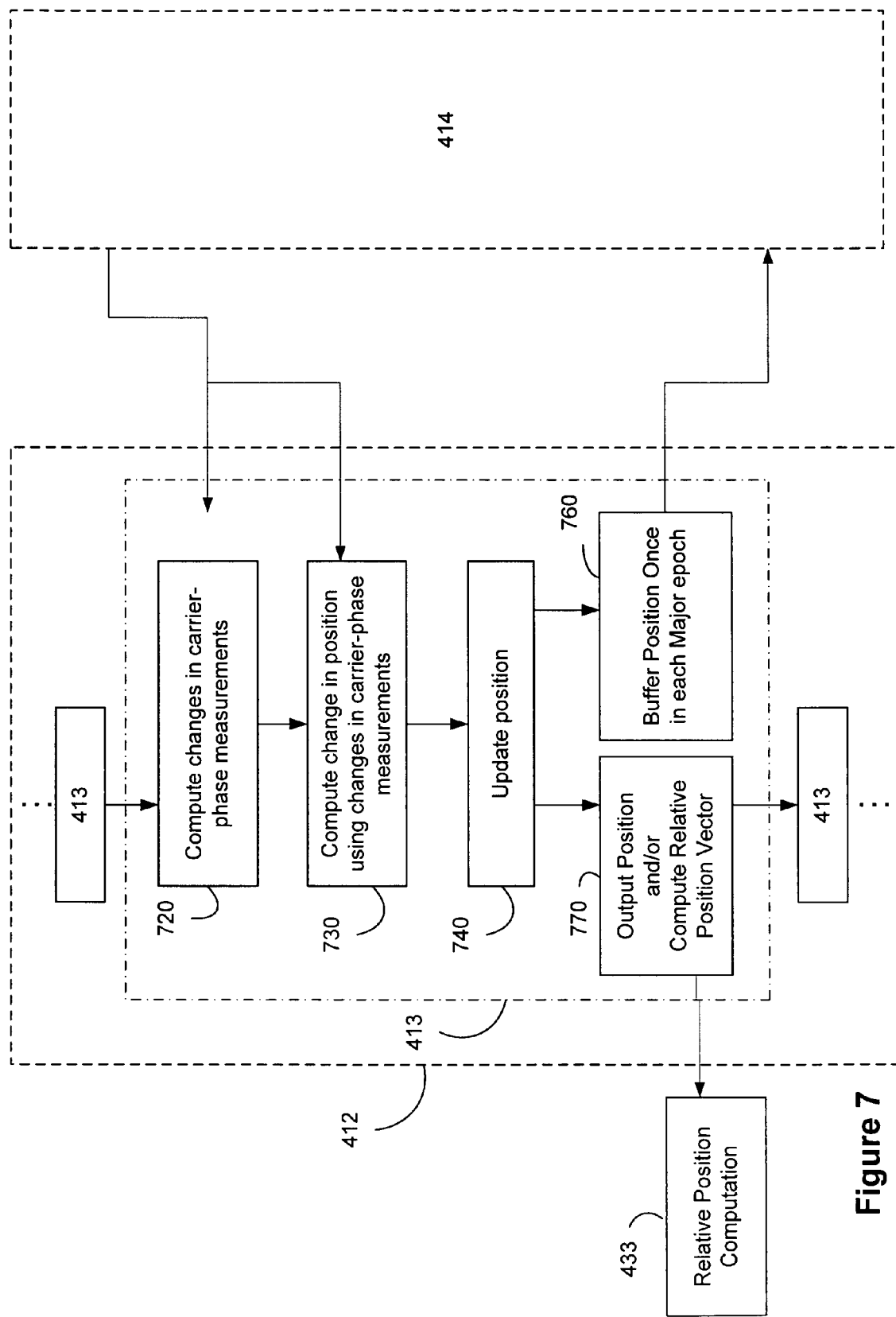
FIG. 7 is a flowchart illustrating a position propagation process performed by the user subsystem according to one embodiment of the present invention.

The high-rate process 412 propagates the user position forward in time by computing an updated user position in each or a series of minor epochs after the initialization process using the position propagation process 213. Because the carrier-phase measurements are typically accurate to less than one centimeter, they can be used to propagate the receiver position forward in time with very little error growth. As shown in FIG. 7, the position propagation process 213 at a particular minor epoch in the high-rate process 212 includes a step 720, in which changes in carrier-phase measurements between two consecutive minor epochs are computed. The changes may be computed using the L1 carrier-phase measurements, i.e., for each satellite 101 involved:

$$\Delta L = L_1^m - L_1^{m-1} \tag{18a}$$

where $\Delta L$ represents the change in carrier-phase measurement with respect to a particular satellite, $L_1^m$ and $L_1^{m-1}$ represent the L1 carrier-phase measurements with respect to the satellite at the particular minor epoch m and at the minor epoch m−1 immediately before the minor epoch m, respectively. Alternatively, the change ΔL may be computed using the average of the corresponding L1 and L2 carrier-phase measurements:

$$\Delta L = L_{12}{}^m - L_{12}{}^{m-1} \quad (18b)$$

where $L_{12}{}^m$ and $L_{12}{}^{m-1}$ represent the average of the L1 and L2 carrier-phase measurements with respect to the satellite at the minor epoch m and at the minor epoch m−1, respectively.

If ionospheric refraction is a concern, refraction-corrected (RC) carrier-phase measurements can be used to compute the changes ΔL, i.e., for each satellite, $$\Delta L = L_{RC}{}^m - L_{RC}{}^{m-1} \quad (18c)$$

where $L_{RC}{}^m$ and $L_{RC}{}^{m-1}$ represent refraction-corrected carrier-phase measurements with respect to the satellite at the minor epoch m and at the minor epoch m−1, respectively. $L^{RCm}$ or $L_{RC}{}^{m-1}$ can be obtained by computing a linear combination of the corresponding carrier-phase measurements in the L1 and L2 frequencies:

$$L_{RC} = \frac{f_1^2}{(f_1^2 - f_2^2)} L_1 - \frac{f_2^2}{(f_1^2 - f_2^2)} L_2 \cong L_1 - 1.5457(L_1 - L_2) \quad (19)$$

In most cases, this ionospheric refraction correction process according to Equation (19) tends to amplify the noise in the measurements and thus is undesirable for use during the high-rate position propagation processes 213 or 223. Also, ignoring the changes in ionospheric refraction effects over the time interval between two consecutive minor epochs should only introduce an error that is less than the noises in the carrier-phase measurements. Therefore, the L1 carrier-phase measurements or the average of the L1 and L2 carrier-phase measurements are preferably used in computing the changes ΔL because they are less noisy than the RC carrier-phase measurements.

The position propagation process 213 further includes a step 730, in which the ΔL computed in step 720 are used to compute the change in the user receiver position between the two adjacent minor epochs m and m−1. To compute the change in the user position using changes in carrier-phase measurements, Equation (13a) with the A and H matrices most recently queued in the low-rate process 414 is used. If the particular minor epoch is one of the first few minor epochs after the initialization process 401, then the A and H matrices computed in the initialization process is used. More efficiently, the B matrix and Equation (13b) may be used. However, if the B matrix is used, the S matrix and Equation (14) also need to be used to provide an alternate method of handling cycle slip or loss of signal during the high-rate processing, as discussed in the co-owned patent application "GPS navigation using successive differences of Carrier-phase measurements," Ser. No. 10/841,689, which disclosure is incorporated herein by reference. The S matrix is usually very insensitive to user position. Thus, it needs to be recomputed only if a significant distance has been traversed by the user receiver 210 since the last position correction process 413.

Whether the A and H or B and S matrices are used, because they are computed in the position correction processes 415 once per each major epoch, they can be repeatedly used to compute the high-rate position updates in a sequence of minor epochs with sufficient accuracy, and thus need not be recomputed at each minor epoch. This significantly simplifies the computation load in the high-rate process 413, wherein the only specific values needing to be recomputed at each minor epoch to implement Equation (13a) or Equations (13b) and (14) are the elements of the innovations vector, z, which are simply the changes in carrier-phase measurement with respect to the involved satellites 101, as computed using Equation (18a), (18b), or (18c).

The position propagation process 213 further includes a step 740, in which the RC carrier-phase changes or differences ΔL are used to compute the change in the state of the user receiver 110 using Equation (13a) or Equations (13b) and (14). The change in the state includes a change $\vec{x}$ to the user receiver position $\vec{X}_{usr}{}^{m-1}$ computed in the minor epoch m−1. Thus, the update to the user receiver position $\vec{X}_{usr}{}^m$ in the minor epoch m can be obtained as follows:

$$\vec{X}_{usr}{}^m = \vec{X}_{usr}{}^{m-1} + \vec{x} \quad (19a)$$

where $\vec{x}$ represents the correction to the receiver position $\vec{X}$, which is in xyz Cartesian coordinates and in terms of an earth-centered, earth-fixed coordinate system. If $\vec{x}$ is in a north, east, up coordinate system, the position change $\vec{x}$ must first be multiplied by an appropriate rotation matrix, R, which should also be computed in the low-rate process 414 and queued for use by the high-rate process 412 along with the A and H (or B and S) matrices. In that case, $$\vec{X}_{usr}{}^m = \vec{X}_{usr}{}^{m-1} + R\vec{x} \quad (19b)$$

where $\vec{x}$ represents the position change in north, east and up coordinates and $\vec{X}_{usr}{}^m$ and $\vec{X}_{usr}{}^{m-1}$ represent the receiver position updates in Cartesian coordinates.

Once in every major epoch, the receiver position $\vec{X}_{usr}{}^m$ is further corrected by adding a position correction $\Delta \vec{x}$ to the position change $\vec{x}$ or to the propagated position $\vec{X}_{usr}{}^m$. The additional correction $\Delta \vec{x}$ is computed in the low-rate process 414 and queued for use by the high-rate process 412, as discussed above. The periodic addition of $\Delta \vec{x}$ helps to prevent any inaccuracies in the high rate updates $\vec{X}_{usr}{}^m$ from being accumulated. The addition of $\Delta \vec{x}$ may be done either before or after the computation of $\vec{x}$ in response to a most recent queuing of computation results in the low-rate process 414. Also once in every major epoch, the position propagation process 213 further includes a step 760 in which the user position update $\vec{X}_{usr}{}^m$ is queued for use by the high-rate process 414, as discussed above.

The position propagation process 213 further includes a step 770 in which the user position update $\vec{X}_{usr}{}^m$ is output to an separate data processing system or to the reference subsystem 120 to compute the relative user position in step 433. Alternatively or additionally, the relative user position may be computed in step 770 at the user subsystem 110 pending receipt of a reference position update $\vec{X}_{ref}{}^m$ for the same minor epoch m, assuming that the clocks in the user subsystem 110 and the reference subsystem are synchronized. No matter where it is computed, the relative position $\vec{X}_r^m$ can be computed as:

$$\vec{X}_r^m = \vec{X}_{usr}^m - \vec{X}_{ref}^m \qquad (20)$$

As discussed above, the reference position update $\vec{X}_{ref}^m$ is computed in a position propagation process 423 for the same minor epoch m in the high-rate process 422, and is transmitted to the user subsystem 110 or to the separate data processing system for the computation of the relative user position $\vec{X}_r^m$. The performance of the position propagation process 423 at the reference subsystem 120 is similar to the performance of the position propagation process 413 at the user subsystem 110, as discussed above, except that the part related to the user receiver 210 is replaced by the corresponding part related to the reference receiver 310.

As discussed above, the user position updates generated in the high-rate process 412 and the reference position updates generated in the low-rate process 422 are used to compute the relative position vector using the processes 433, as shown in FIG. 4B. The processes 433 can be carried out in the user subsystem 110 either as part of the high-rate process 412 or in a separate thread after the initialization process 401, if the reference position updates needed for the computation can be timely transmitted to the user subsystem 110. If the computation of the relative position vector is done in the high-rate process 412, the reference position update for a specific minor epoch needs to be transmitted to the user subsystem 110 within that minor epoch. By using a separate thread for the processes 433, a process 433 for a specific minor epoch can wait for the arrival of the reference position update for the minor epoch before computing the relative position vector for that minor epoch. This way, the reference position update for the minor epoch does not need to be transmitted to the user subsystem 110 within that minor epoch but the result of the process 433 for the minor epoch may not be available until several minor epochs later. Similarly, the processes 433 may also be carried out in the reference subsystem 120 either as part of the high-rate process 422 or in a separate thread after the initialization process 402, if the user position updates needed for the computation can be timely transmitted to the reference subsystem 120. The processes 433 may also be carried out in a separate data processing system. The only requirement for computing the relative position vector is that the positions of both the user and the reference receivers be available.

We claim:

1. A method for navigating a first object with reference to a second object, comprising:
    obtaining a set of carrier-phase measurements according to signals received at the first object from a plurality of satellites;
    correcting the set of carrier-phase measurements using corrections computed for the second object according to signals received at the second object from the plurality of satellites; wherein the second object is a moving object;
    determining a position correction for the first object using the corrected set of carrier-phase measurements;
    receiving a computed position of the second object; and
    computing a vector difference between a computed position of the first object and the computed position of the second object.

2. The method of claim 1 further comprising adding the position correction to a computed position of the first object to obtain a corrected position of the first object.

3. The method of claim 2 further comprising computing position updates for the first object using successive changes in the carrier-phase measurements obtained at the first object from the plurality of satellites.

4. The method of claim 3 wherein the changes in the carrier-phase measurements are refraction-corrected.

5. The method of claim 1 wherein determining the position correction comprises resolving integer ambiguities in the carrier-phase measurements.

6. A method for a moving reference station to provide measurement corrections to at least one navigating object, comprising:
    obtaining code and carrier-phase measurements at the moving reference station according to signals from a plurality of satellites;
    forming carrier-smoothed code measurements corresponding to the code and carrier-phase measurements;
    determining a position of the reference station using the carrier-smoothed code measurements;
    computing a theoretical range between the moving reference station and each of the plurality of satellites using the position of the reference station;
    computing measurement corrections using the theoretical range; and
    transmitting the position of the reference station and the measurement corrections to at least one navigating object, so as to enable computation of a vector difference between a computed position of the at least one navigating object and the position of the reference station.

7. The method of claim 6 wherein the code and carrier-phase measurements include measurement corrections provided by a wide-area or global navigation system.

8. The method of claim 6 wherein the carrier-smoothed code measurements include measurement corrections provided by a wide-area or global navigation system.

9. In a satellite navigation system comprising a moving reference station, a method for determining a position of a user of the satellite navigation system relative to a position of the moving reference station, comprising:
    determining the position of the moving reference station according to signals received at the moving reference station from a plurality of satellites;
    determining the position of the user based on measurements obtained at the user according to signals received by the user from the plurality of satellites and corrections to the measurements determined in accordance with signals received at the moving reference station from the plurality of satellites; and
    computing a vector difference between the position of the user and the position of the moving reference station.

10. The method of claim 9 wherein the vector difference is computed at the user.

11. The method of claim 9 wherein the vector difference is computed at the moving reference station.

12. The method of claim 9 wherein the vector difference is computed at a separate data processing system that receives the position of the user from the user and the position of the moving reference station from the moving reference station.

13. The method of claim 9 wherein determining the position of the reference station comprises determining a change in the position of the reference station based on changes in carrier-phase measurements obtained at the reference station according to signals from the plurality of satellites.

14. The method of claim 9 wherein determining the position of the user comprises determining a change in the position of the user based on changes in carrier-phase measurements obtained at the user according to signals from the plurality of satellites.

15. A satellite navigation system, comprising:
a moving reference subsystem configured to:
obtain first satellite range measurements according to signals received by the moving reference subsystem from a plurality of satellites;
determine a reference position associated with the moving reference subsystem according to the first satellite range measurements; and
compute error corrections to the first satellite range measurements, the error corrections including error corrections to carrier-phase measurements; and
a user subsystem configured to:
receive the error corrections from the moving reference subsystem;
obtain second satellite range measurements according to signals received by the user subsystem from the plurality of satellites, the second satellite range measurements including carrier-phase measurements;
adjusting the second satellite range measurements using the error corrections; and
determine a user position based on the adjusted second satellite range measurements; and
wherein the satellite navigation system determines a relative position vector by differencing the user position and the reference position.

16. A computer-readable medium storing therein computer readable instructions that when executed by a processor cause the processor to perform a method for navigating a first object with reference to a second object, the instructions comprising:
instructions for obtaining a set of measurements according to signals received at the first object from a plurality of satellites;
instructions for correcting the set of measurements using corrections computed for the second object according to signals received at the second object from the plurality of satellites; wherein the second object is a moving object;
instructions for determining a position correction for the first object using the corrected set of measurements;
instructions for receiving a computed position of the second object; and
instructions for computing a vector difference between a computed position of the first object and the computed position of the second object.

17. The computer-readable medium of claim 16 further comprising instructions for adding the position correction to a computed position of the first object to obtain a corrected position of the first object.

18. The computer-readable medium of claim 17 further comprising instructions for computing position updates for the first object using successive changes in a set of carrier-phase measurements obtained at the first object from the plurality of satellites.

19. A computer-readable medium storing therein computer readable instructions that when executed by a processor cause the processor to perform a method for a moving reference station to provide measurement corrections to at least one navigating object, the instructions comprising:
instructions for obtaining code and carrier-phase measurements at the moving reference station according to signals from a plurality of satellites;
instructions for forming carrier-smoothed code measurements corresponding to the code and carrier-phase measurements;
instructions for determining a position of the moving reference station using the carrier-smoothed code measurements;
instructions for computing a theoretical range between the moving reference station and each of the plurality of satellites using the position of the reference station;
instructions for computing measurement corrections using the theoretical range;
instructions for transmitting the position of the reference station and the measurement corrections to the at least one navigating object, so as to enable computation of a vector difference between a computed position of the at least one navigating object and the position of the reference station.

* * * * *